US007483178B2

(12) United States Patent
Lee et al.

(10) Patent No.: US 7,483,178 B2
(45) Date of Patent: Jan. 27, 2009

(54) MULTI-FUNCTION PERIPHERAL WHICH FACILITATES MAINTENANCE

(75) Inventors: Tzu-Hsiung Lee, Taipei (TW); Devon Shyu, Kuei Jen Hsiang (TW)

(73) Assignee: Avision Inc. (TW)

( * ) Notice: Subject to any disclaimer, the term of this patent is extended or adjusted under 35 U.S.C. 154(b) by 796 days.

(21) Appl. No.: 10/990,397

(22) Filed: Nov. 18, 2004

(65) Prior Publication Data

US 2005/0111050 A1 May 26, 2005

(30) Foreign Application Priority Data

Nov. 24, 2003 (TW) .............................. 92132960 A

(51) Int. Cl.
*B41C 1/00* (2006.01)
*G06F 15/00* (2006.01)
*G06F 3/12* (2006.01)

(52) U.S. Cl. ...................................... 358/3.32; 358/1.1

(58) Field of Classification Search ......... 358/1.1–1.18, 358/400–498
See application file for complete search history.

(56) References Cited

U.S. PATENT DOCUMENTS 6,057,936 A * 5/2000 Obara et al. ................ 358/296
6,647,243 B2 * 11/2003 Sato et al. ................... 399/407

FOREIGN PATENT DOCUMENTS

TW 530588 9/2001

* cited by examiner

*Primary Examiner*—Douglas Q Tran

(57) ABSTRACT

A multi-function peripheral which facilitates maintenance includes a scanner unit, a printer unit and a support assembly. The support assembly includes a top platen, on which the scanner unit is placed, a bottom platen, on which the printer unit is placed, and a vertical support column for connecting the top platen to the bottom platen. The top platen is capable of being rotated about the vertical support column relative to the bottom platen, or the vertical support column is retractable to enlarge a buffer space above the printer unit and to facilitate the maintenance of the printer unit.

13 Claims, 7 Drawing Sheets

MULTI-FUNCTION PERIPHERAL WHICH FACILITATES MAINTENANCE

BACKGROUND OF THE INVENTION

1. Field of the Invention

The invention relates to a multi-function peripheral, and more particularly to a multi-function peripheral that is easy to be maintained and is separable.

2. Description of the Related Art

The multi-function peripheral has been gradually popularized because the scan, print, fax, copy, and even e-mail functions have been incorporated therein. There are two types of multi-function peripherals including a first type of multi-function peripheral that cannot be separated and a second type of multi-function peripheral that can be separated. The second type can provide better effects because the user can expand and upgrade the multi-function peripheral according to his/her requirements.

FIG. 1 is a schematic illustration showing a conventional multi-function peripheral. FIG. 2 shows an open state of a scanner unit in the multi-function peripheral of FIG. 1. Referring to FIGS. 1 and 2, the conventional multi-function peripheral 110 includes a scanner unit 120, a printer unit 130 and a support assembly 140. The scanner unit 120 is placed on a top platen 141 of the support assembly 140, and the printer unit 130 is placed on a bottom platen 142 of the support assembly 140. A vertical support column 143 is pivoted to the top platen 141 and fixed to the bottom platen 142. When the user wants to maintain the printer unit 130, he or she has to lift up the top platen 141, as shown in FIG. 2, so as to facilitate the maintenance.

However, this structure encounters the following problems.

1. When the scanner unit is opened, a supporting mechanism such as an oil cylinder has to be used to support the scanner unit. Thus, the cost of the multi-function peripheral cannot be reduced, and the maintenance is inconvenient.

2. When the scanner unit is opened, the scanner unit may fall down and be damaged, which is quite inconvenient during the usage. Especially, when the scanner unit includes an automatic document feeder or when the scanner unit has a large size (e.g., when the scanner is an A3 size scanner), the great weight of the scanner unit tends to cause this problem.

Hence, it is an important subject of the invention to provide a multi-function peripheral which facilitates the maintenance.

SUMMARY OF THE INVENTION

It is therefore an object of the invention to provide a multi-function peripheral which facilitates the maintenance.

Another object of the invention is to provide a multi-function peripheral which may be maintained by effectively utilizing the space in the office.

The invention achieved the above-mentioned objects by providing a multi-function peripheral including a scanner unit, a printer unit and a support assembly. The scanner unit scans a to-be-scanned document and generates a printing signal. The printer unit receives the printing signal and prints a to-be-printed sheet. The support assembly includes a top platen, on which the scanner unit is placed, a bottom platen, on which the printer unit is placed, and a vertical support column for connecting the top platen to the bottom platen. The top platen is capable of being rotated about the vertical support column relative to the bottom platen to enlarge a buffer space above the printer unit and to facilitate the maintenance of the printer unit.

According to the above-mentioned structure, the multi-function peripheral of the invention may effectively utilize the available space such that the usage of the multi-function peripheral is more convenient.

DETAILED DESCRIPTION OF THE INVENTION

Figure 1:
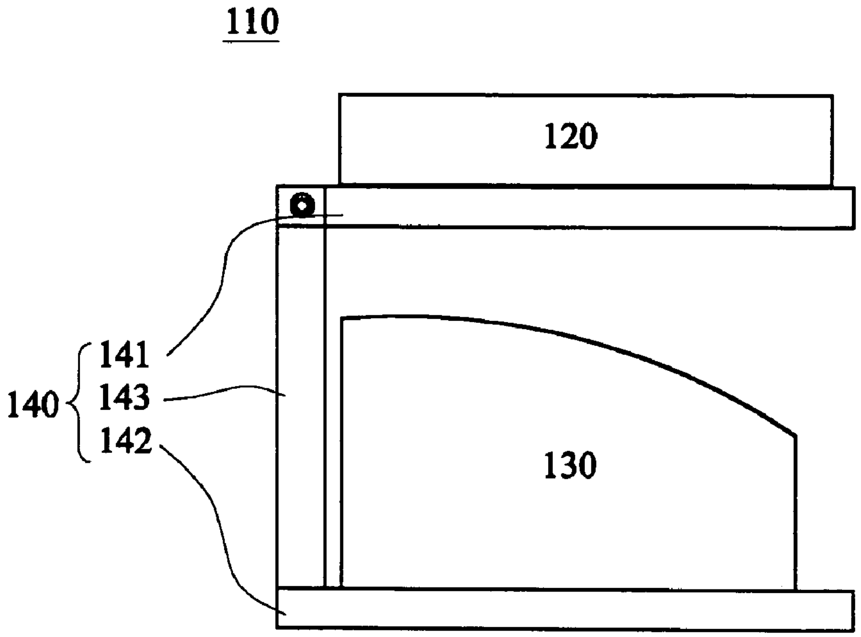
FIG. 1 (Prior Art)
FIG. 1 is a schematic illustration showing a conventional multi-function peripheral.
Figure 2:
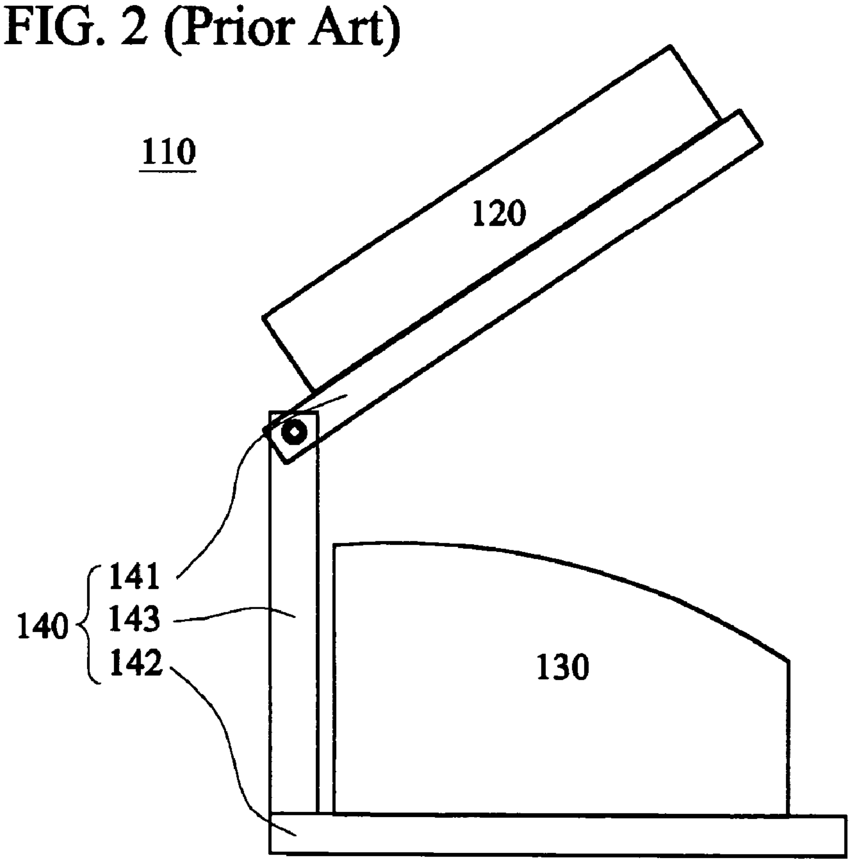
FIG. 2 (Prior Art)
FIG. 2 shows an open state of a scanner unit in the multi-function peripheral of FIG. 1.
Figure 3:
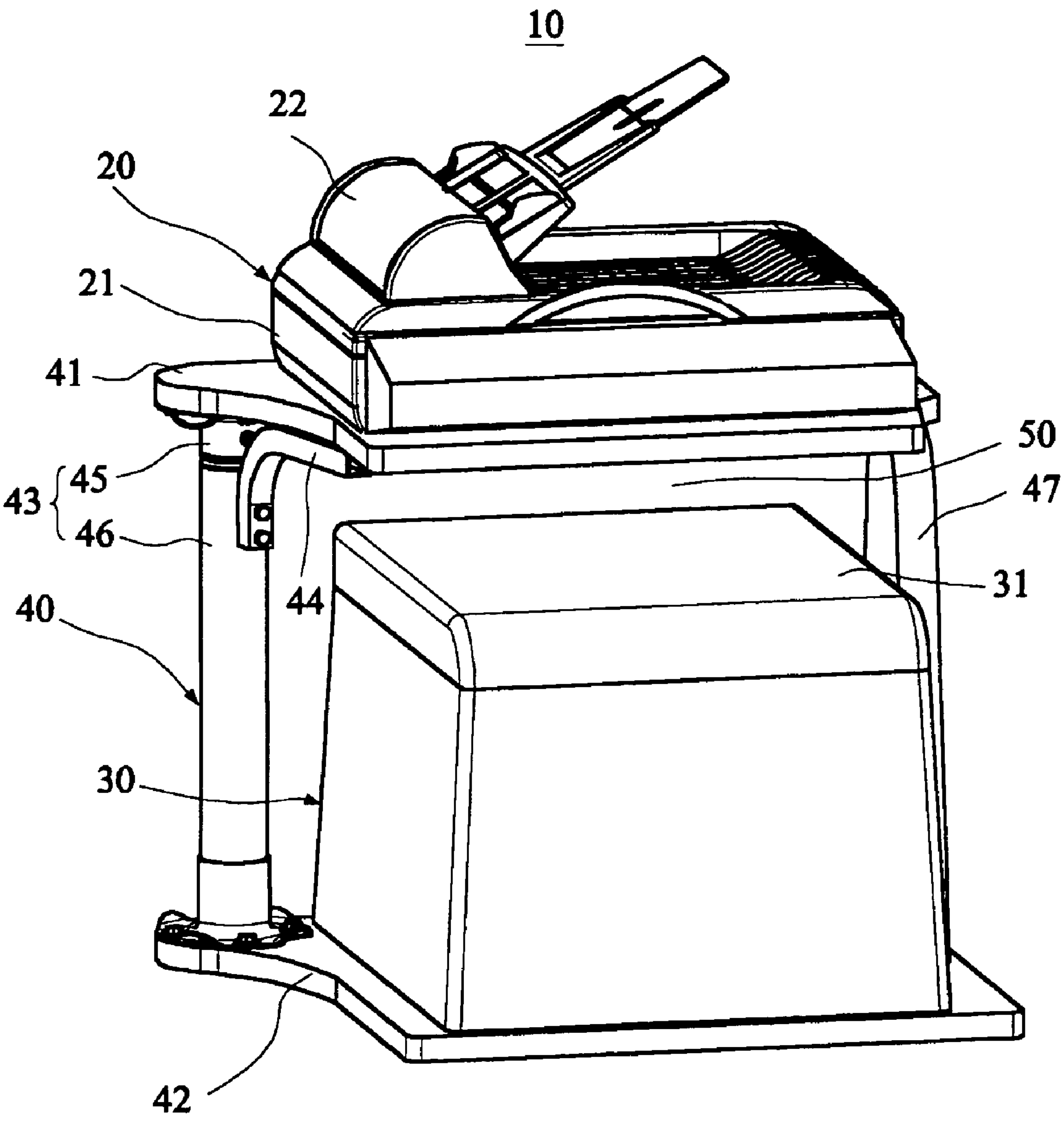
FIG. 3 is a pictorial view showing a normal state of a multi-function peripheral according to a first embodiment of the invention.
Figure 4:
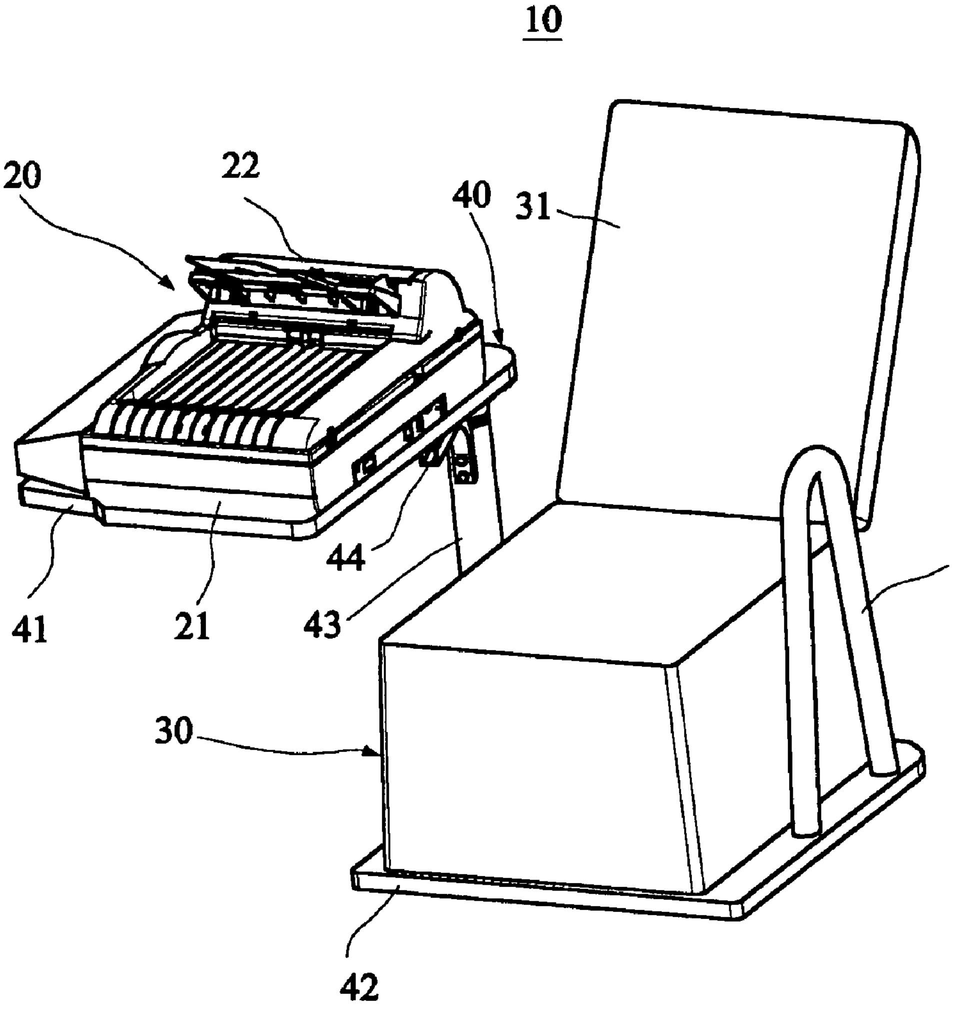
FIG. 4 is a pictorial view showing a maintenance state of the multi-function peripheral according to the first embodiment of the invention.
Figure 5:
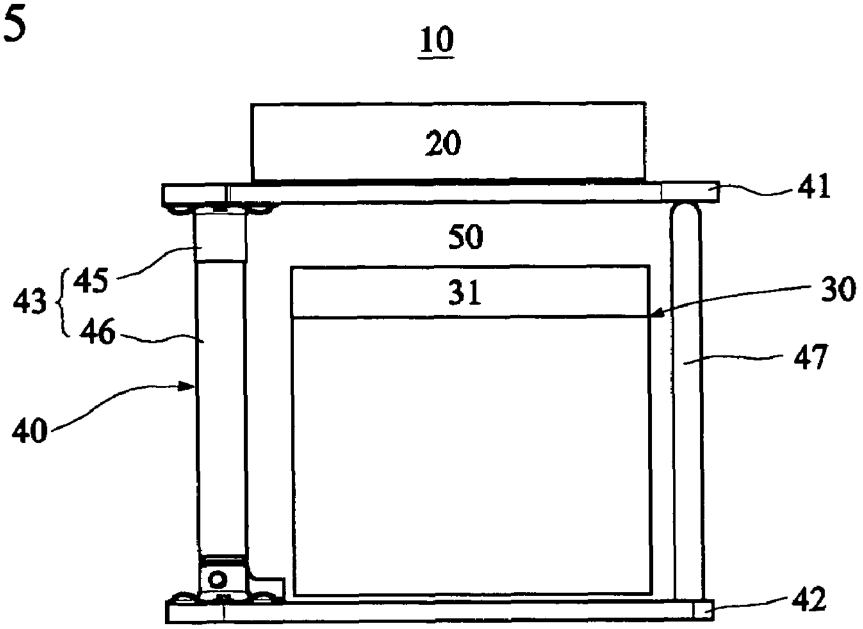
FIG. 5 is a schematic front view of FIG. 3.
Figure 6:
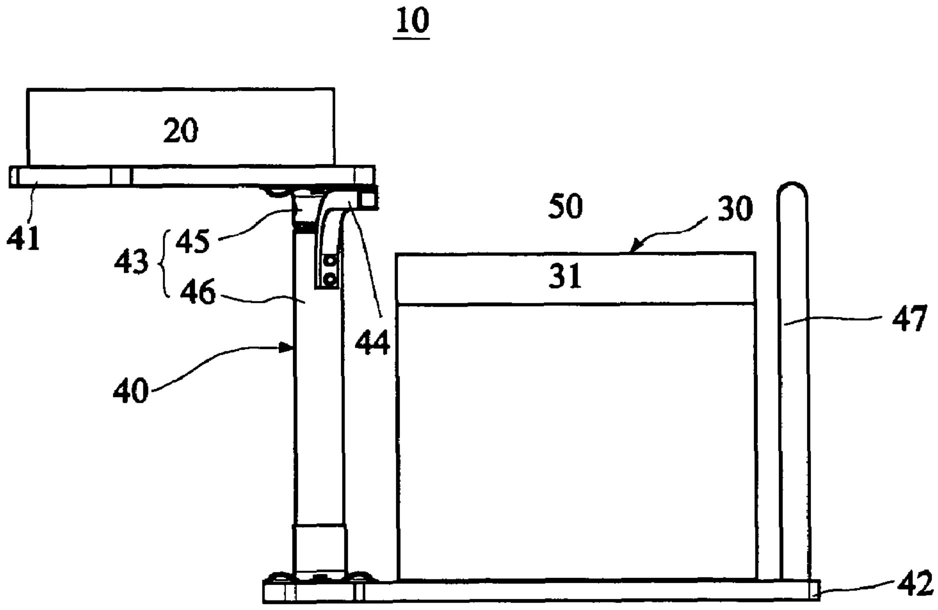
FIG. 6 is a schematic side view of FIG. 4.

FIGS. 3 and 4 are pictorial views respectively showing a normal state and a maintenance state of a multi-function peripheral according to a first embodiment of the invention. FIGS. 5 and 6 are schematic front and side views of FIGS. 3 and 4, respectively. Referring to FIGS. 3 to 6, the multi-function peripheral 10 of this embodiment includes a scanner unit 20, a printer unit 30 and a support assembly 40. The scanner unit 20, which is typically a scanner (e.g., a flatbed scanner 21) and may further have an automatic document feeder 22, can scan a to-be-scanned document and generate a printing signal. The printer unit 30, which is typically a printer and has a cover 31, can receive the printing signal and print a to-be-printed sheet. The support assembly 40 includes a top platen 41, a bottom platen 42, a vertical support column 43, a horizontal support column 44, and an auxiliary vertical support column 47.

The scanner unit 20 is placed on the top platen 41, and the printer unit 30 is placed on the bottom platen 42. The top platen 41 and the bottom platen 42 may be either plate-like structures or frame-like structures as long as they can support the scanner unit 20 and the printer unit 30, respectively.

The vertical support column 43 connects the top platen 41 to the bottom platen 42, wherein the top platen 41 can be rotated about the vertical support column 43 and about an axis extending from the top platen 41 to the bottom platen 42 relative to the bottom platen 42 in order to enlarge a buffer space 50 above the printer unit 30 and to facilitate the maintenance of the printer unit 30. As shown in FIGS. 4 and 6, the top platen 41 is rotated 90 degrees about the vertical support column 43 so that the user can lift up the cover 31 of the printer unit 30 so as to perform the maintenance works such as the replacement of the consumable material or elimination of the paper jams.

The horizontal support column 44 connects the top platen 41 to the vertical support column 43 so as to assist in supporting the top platen 41. The auxiliary vertical support column 47 is connected to the bottom platen 42 in order to assist in supporting the top platen 41 in a normal state of the multi-function peripheral 10. It is to be noted that the horizontal support column 44 and the auxiliary vertical support column 47 may be omitted.

The vertical support column 43 may include a rotation shaft 45 and a stationary shaft 46. The rotation shaft 45 is fixed to the top platen 41, and the stationary shaft 46 is fixed to the bottom platen 42 and connected to the rotation shaft 45. One of ordinary skill in the art may easily implement another pivotal structure, in which the top platen 41 can be rotated about the vertical support column 43 relative to the bottom platen 42. Alternatively, in the limited space of the office, if the top platen 41 cannot be rotated, it is also possible to rotate the bottom platen 42 such that the user can perform the maintenance works on the multi-function peripheral.

Figure 7:
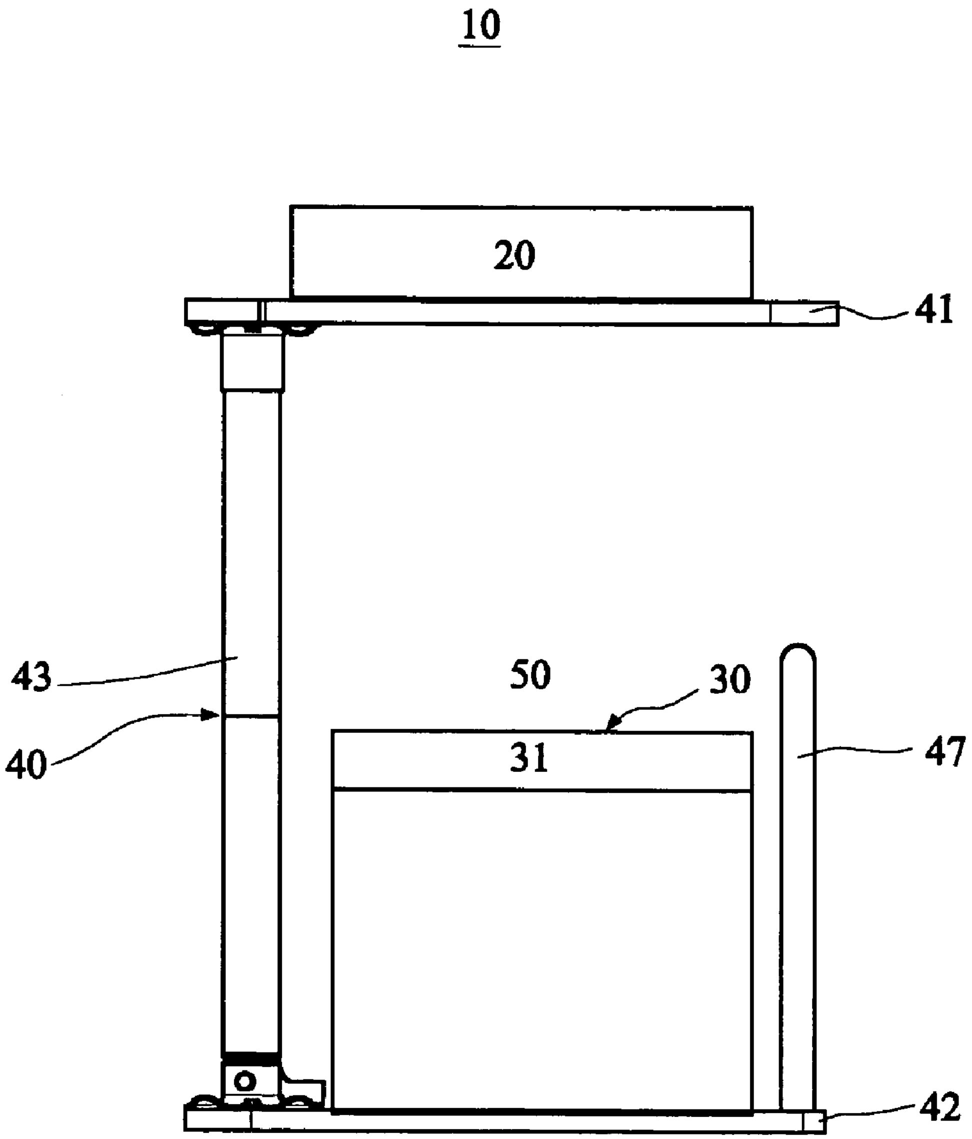
FIG. 7 is a schematic front view showing a maintenance state of a multi-function peripheral according to a second embodiment of the invention.

FIG. 7 is a schematic front view showing a maintenance state of a multi-function peripheral according to a second embodiment of the invention. As shown in FIG. 7, this embodiment is similar to the first embodiment but differs from the first embodiment in that the vertical support column 43 is retractable in length and in a direction along an axis extending from the top platen 41 to the bottom platen 42 so that the buffer space 50 above the printer unit 30 may be enlarged and the maintenance of the printer unit 30 may be facilitated. The structure is particularly useful when the top platen 41 cannot be rotated.

Figure 8:
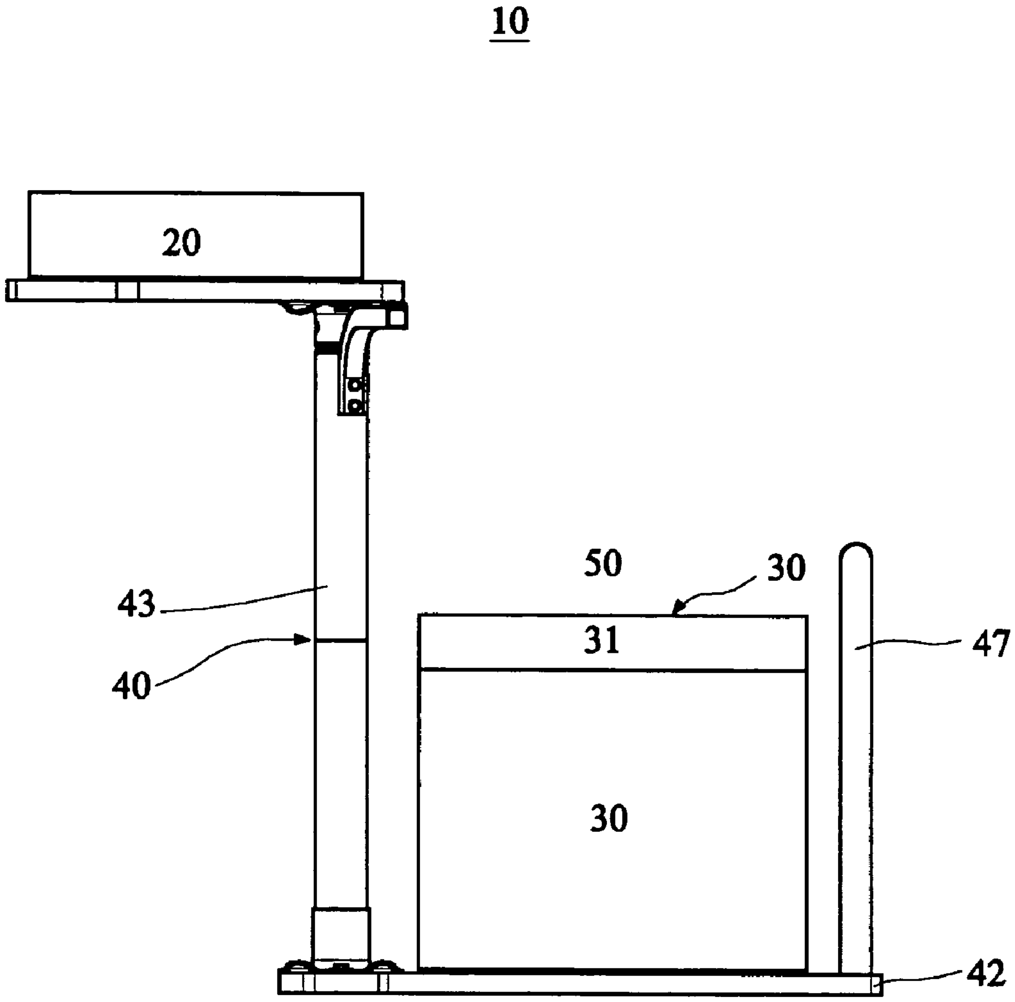
FIG. 8 is a schematic front view showing a maintenance state of a multi-function peripheral according to a third embodiment of the invention.

FIG. 8 is a schematic front view showing a maintenance state of a multi-function peripheral according to a third embodiment of the invention. As shown in FIG. 8, the embodiment combines the features of the first and second embodiments such that the vertical support column 43 is retractable in length, and the top platen 41 can be rotated about the vertical support column 43 relative to the bottom platen 42. Thus, the buffer space 50 above the printer unit 30 may be enlarged, and the maintenance of the printer unit 30 may be facilitated.

Figure 9:
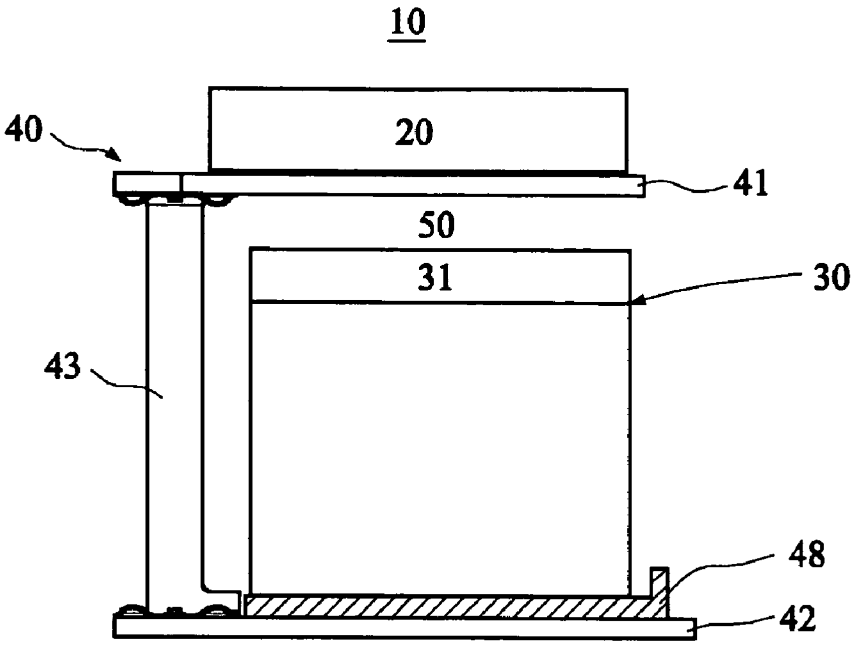
FIG. 9 is a schematic front view showing a usage state of a multi-function peripheral according to a fourth embodiment of the invention.
Figure 10:
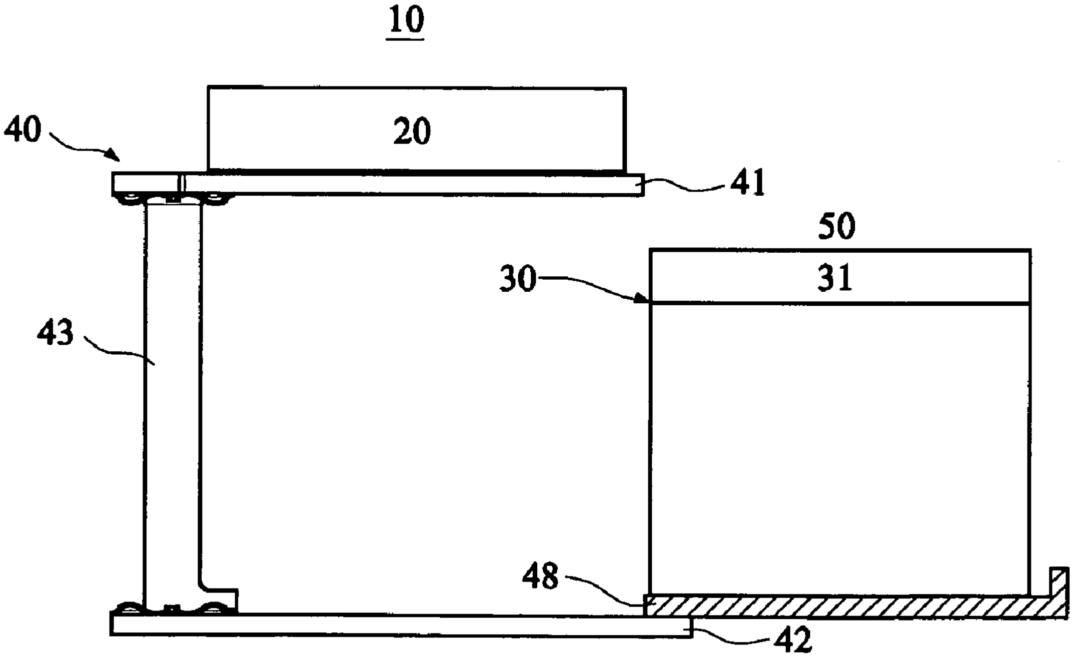
FIG. 10 is a schematic front view showing a maintenance state of the multi-function peripheral according to the fourth embodiment of the invention.

FIGS. 9 and 10 are schematic front views showing a usage state and a maintenance state of a multi-function peripheral according to a fourth embodiment of the invention. Referring to FIGS. 9 and 10, the multi-function peripheral 10 of this embodiment includes a scanner unit 20, a printer unit 30 and a support assembly 40. The scanner unit 20 scans a to-be-scanned document and generates a printing signal, and the printer unit 30 receives the printing signal and prints a to-be-printed sheet. The support assembly 40 includes a top platen 41, a bottom platen 42, a sliding platen 48 and a vertical support column 43. The scanner unit 20 is placed on the top platen 41, and the printer unit 30 is placed on the sliding platen 48 and is slidably mounted to the bottom platen 42. The bottom platen 42 may be a horizontal plate, or a mounting seat fixed to the vertical support column 43 such that the sliding platen 48 may slide and be positioned over there. In this case, the bottom platen 42 and the sliding platen 48 may be combined into an entity.

Alternatively, it is also possible to design the top platen 41 such that it can slide horizontally relative to the bottom platen 42. Therefore, when the top platen 41 is horizontal pulled out, the buffer space 50 also may be enlarged, which is also advantageous to the maintenance. In this case, the top platen 41 and the sliding platen 48 may be combined into an entity, or separable members.

Consequently, as long as the top platen 41 and the bottom platen 42 may horizontally slide relative to each other so as to displace the scanner unit 20 from a position on top of the printer unit 30, the function of the invention may be achieved.

The vertical support column 43 connects the top platen 41 to the bottom platen 42. The feature that the sliding platen 48 can slide over the bottom platen 42 can enlarge the buffer space 50 above the printer unit 30 so as to facilitate the maintenance of the printer unit 30.

The scanner unit may also have an automatic document feeder, as mentioned above. When the multi-function peripheral is at the usage state, it is preferred to utilize a fixing member to mount the sliding platen 48 to the bottom platen 42. Such a drawer-like design can enable the user to pull out the sliding platen 48 to facilitate the maintenance of the printer unit 30 without influencing the status of the scanner unit.

According to the above-mentioned structure, when the user is maintaining the multi-function peripheral, the scanner unit still can be stably held on the top platen such that the overall maintenance procedures are more convenient and smoother.

While the invention has been described by way of examples and in terms of preferred embodiments, it is to be understood that the invention is not limited to the disclosed embodiments. To the contrary, it is intended to cover various modifications. Therefore, the scope of the appended claims should be accorded the broadest interpretation so as to encompass all such modifications.

What is claimed is:

1. A multi-function peripheral, comprising:
- a scanner unit for scanning a to-be-scanned document and generating a printing signal;
- a printer unit for receiving the printing signal and printing a to-be-printed sheet; and
- a support assembly, which comprises:
  - a top platen, on which the scanner unit is placed;
  - a bottom platen, on which the printer unit is placed; and
  - a vertical support column for connecting the top platen to the bottom platen, wherein the top platen is capable of being rotated about the vertical support column and about an axis extending from the top platen to the bottom platen relative to the bottom platen to enlarge a buffer space above the printer unit and to facilitate maintenance of the printer unit.

2. The multi-function peripheral according to claim 1, wherein the support assembly further comprises:
- a horizontal support column for connecting the top platen to the vertical support column in order to assist in supporting the top platen.

3. The multi-function peripheral according to claim 1, wherein the vertical support column comprises:
- a rotation shaft fixed to the top platen; and
- a stationary shaft fixed to the bottom platen and connected to the rotation shaft.

4. The multi-function peripheral according to claim 1, wherein the vertical support column is retractable in length.

5. The multi-function peripheral according to claim 1, wherein the scanner unit has an automatic document feeder.

6. A multi-function peripheral, comprising:
- a scanner unit for scanning a to-be-scanned document and generating a printing signal;
- a printer unit for receiving the printing signal and printing a to-be-printed sheet; and
- a support assembly, which comprises:

a top platen, on which the scanner unit is placed;

a bottom platen, on which the printer unit is placed; and a vertical support column for connecting the top platen to the bottom platen, wherein the vertical support column is retractable in a direction along an axis extending from the top platen to the bottom platen to enlarge a buffer space above the printer unit and to facilitate maintenance of the printer unit.

7. The multi-function peripheral according to claim 6, wherein the support assembly further comprises:

a horizontal support column for connecting the top platen to the vertical support column in order to assist in supporting the top platen.

8. The multi-function peripheral according to claim 6, wherein the top platen is capable of being rotated about the vertical support column relative to the bottom platen.

9. The multi-function peripheral according to claim 6, wherein the scanner unit has an automatic document feeder.

10. A multi-function peripheral, comprising:

a scanner unit for scanning a to-be-scanned document and generating a printing signal;

a printer unit for receiving the printing signal and printing a to-be-printed sheet; and a support assembly, which comprises:

a top platen, on which the scanner unit is placed;

a bottom platen, on which the printer unit is placed; and a vertical support column for connecting the top platen to the bottom platen, wherein the top platen and the bottom platen may slide horizontally relative to each other so as to displace the scanner unit from a position on top of the printer unit, to enlarge a buffer space above the printer unit and to facilitate maintenance of the printer unit.

11. The multi-function peripheral according to claim 10, wherein the top platen is stationary while the bottom platen may slide horizontally.

12. The multi-function peripheral according to claim 10, wherein the bottom platen is stationary while the top platen may slide horizontally.

13. The multi-function peripheral according to claim 10, wherein the scanner unit has an automatic document feeder.

* * * * *